US011479338B2

(12) United States Patent
Carr et al.

(10) Patent No.: US 11,479,338 B2
(45) Date of Patent: Oct. 25, 2022

(54) DUCTED FAN ASSEMBLY WITH BLADE IN LEADING EDGE

(71) Applicant: Bell Textron Inc., Fort Worth, TX (US)

(72) Inventors: Timothy Brian Carr, Fort Worth, TX (US); William Anthony Amante, Grapevine, TX (US); Michael Reaugh Smith, Colleyville, TX (US)

(73) Assignee: Textron Innovations Inc., Providence, RI (US)

( * ) Notice: Subject to any disclaimer, the term of this patent is extended or adjusted under 35 U.S.C. 154(b) by 4 days.

(21) Appl. No.: 17/037,082

(22) Filed: Sep. 29, 2020

(65) Prior Publication Data
US 2022/0097823 A1 Mar. 31, 2022

(51) Int. Cl.
*B64C 11/00* (2006.01)
*B64C 29/00* (2006.01)

(52) U.S. Cl.
CPC ........ *B64C 11/001* (2013.01); *B64C 29/0033* (2013.01)

(58) Field of Classification Search
CPC ......... B64C 11/001; B64C 27/20; B64C 1/34; B64D 2033/022
See application file for complete search history.

(56) References Cited

U.S. PATENT DOCUMENTS

| 3,054,578 | A | | 9/1962 | Brocard | |
|---|---|---|---|---|---|
| 3,083,934 | A | | 4/1963 | Vanderlip | |
| 3,285,003 | A | * | 11/1966 | Martin | B64C 29/0058 415/217.1 |
| 3,494,380 | A | | 2/1970 | Martin | |
| 3,524,611 | A | * | 8/1970 | Frank | B64C 29/0075 244/12.4 |
| 4,843,992 | A | | 7/1989 | Babikian | |
| 5,160,248 | A | | 11/1992 | Clarke | |
| 5,351,913 | A | * | 10/1994 | Cycon | B64C 39/024 416/115 |
| 5,609,314 | A | | 3/1997 | Rauckhorst, III et al. | |
| 6,575,402 | B1 | * | 6/2003 | Scott | F01P 5/02 244/12.3 |
| 9,297,333 | B2 | | 3/2016 | Filter | |

(Continued)

OTHER PUBLICATIONS

Amante, William Anthony, et al.; "Ducted Fan Assembly for an Aircraft"; U.S. Appl. No. 17/036,798, filed Sep. 29, 2020; 34 pages.

(Continued)

*Primary Examiner* — Richard R. Green
*Assistant Examiner* — William L Gmoser
(74) *Attorney, Agent, or Firm* — Shackelford, Bowen, McKinley & Norton, LLP (57) ABSTRACT

In an embodiment, a ducted fan assembly includes a housing that further includes a rotor. The ducted fan assembly also includes a rim that extends around at least a portion of a perimeter of the ducted fan assembly, where the rim defines an opening surrounding at least a portion of the housing. The ducted fan assembly also includes a skin that is attached to the rim and extends around the at least a portion of a perimeter of the ducted fan assembly to form a leading edge of the ducted fan assembly. The ducted fan assembly also includes a blade positioned on the rim underneath the skin.

20 Claims, 5 Drawing Sheets

(56) References Cited

U.S. PATENT DOCUMENTS

| | | |
|---|---|---|
| 9,975,631 B1 | 5/2018 | McLaren et al. |
| 10,641,290 B1 | 5/2020 | Piasecki et al. |
| 10,737,766 B2 | 8/2020 | Mores et al. |
| 2006/0032983 A1 | 2/2006 | Brand et al. |
| 2008/0179448 A1 | 7/2008 | Layland et al. |
| 2011/0147533 A1 | 6/2011 | Goossen et al. |
| 2015/0314865 A1 | 11/2015 | Bermond et al. |
| 2017/0341725 A1 | 11/2017 | Skahan |
| 2018/0208305 A1 | 7/2018 | Lloyd et al. |
| 2019/0283888 A1 | 9/2019 | Hines |
| 2020/0354051 A1 | 11/2020 | Besse et al. |

OTHER PUBLICATIONS

Amante, William Anthony, et al.; "Ducted Fan Assembly With a Movable Leading Edge"; U.S. Appl. No. 17/036,942, filed Sep. 29, 2020; 43 pages.

Carr, Timothy Brian, et al.; "Ducted Fan Assembly With Material-Filled Cavity in Leading Edge"; U.S. Appl. No. 17/037,190, filed Sep. 29, 2020; 38 pages.

\* cited by examiner

DUCTED FAN ASSEMBLY WITH BLADE IN LEADING EDGE

TECHNICAL FIELD

The present disclosure relates generally to rotor-driven aircraft and more particularly, but not by way of limitation, to a duct design for a rotor.

BACKGROUND

This section provides background information to facilitate a better understanding of the various aspects of the disclosure. It should be understood that the statements in this section of this document are to be read in this light, and not as admissions of prior art.

Rapid commercial growth and expansion of urban areas often increases the distance from one side of a metropolitan area to another. This rapid commercial growth and expansion often results in an increase in the population, further resulting in more congestion and emissions due to an increased number of vehicles on the current highway infrastructure. As technology further increases, such metropolitan areas will continue to grow, placing serious burden on the current highway infrastructure to handle the increased traffic and furthering the need for improved travel across a metropolitan area that reduces emissions while allowing faster, more convenient, and more efficient travel throughout a metropolitan area and/or between bordering states. One approach is to utilize tiltrotor aircraft to carry people across metropolitan areas. Tiltrotor aircraft are configured to fly in helicopter mode for vertical takeoff and landing (VTOL) and in airplane mode for high-speed flight. These aircraft are preferably compact and light-weight vehicles. As with all commercial aircraft, safety is a primary concern. One safety aspect in consideration is the durability of components of the aircraft, such as the rotor ducts. For example, aircraft sometimes encounter foreign objects (e.g., birds or debris) that may strike a rotor or a rotor duct. To ensure the safety of the occupants of the aircraft, components of the aircraft (e.g., the rotor duct) are designed to withstand strikes from foreign objects.

SUMMARY

This summary is provided to introduce a selection of concepts that are further described below in the detailed description. This summary is not intended to identify key or essential features of the claimed subject matter, nor is it to be used as an aid in limiting the scope of the claimed subject matter.

In an embodiment, a ducted fan assembly includes a housing that further includes a rotor. The ducted fan assembly also includes a rim that extends around at least a portion of a perimeter of the ducted fan assembly, where the rim defines an opening surrounding at least a portion of the housing. The ducted fan assembly also includes a skin that is attached to the rim and extends around the at least a portion of a perimeter of the ducted fan assembly to form a leading edge of the ducted fan assembly. The ducted fan assembly also includes a blade positioned on the rim underneath the skin.

In an embodiment, a rotorcraft includes a plurality of fan assemblies. Each fan assembly includes a housing that further includes a rotor. Each fan assembly also includes a rim that extends around at least a portion of a perimeter of the fan assembly, where the rim defines an opening surrounding at least a portion of the housing. Each fan assembly also includes a skin that is attached to the rim and extends around the at least a portion of a perimeter of the fan assembly to form a leading edge of the fan assembly. Each fan assembly also includes a blade positioned on the rim underneath the skin.

BRIEF DESCRIPTION OF THE DRAWINGS

The disclosure is best understood from the following detailed description when read with the accompanying figures. It is emphasized that, in accordance with standard practice in the industry, various features are not drawn to scale. In fact, the dimensions of various features may be arbitrarily increased or reduced for clarity of discussion.

DETAILED DESCRIPTION

Various aspects will now be described more fully with reference to the accompanying drawings. The disclosure may, however, be embodied in many different forms and should not be construed as limited to the aspects set forth herein.

Figure 1:
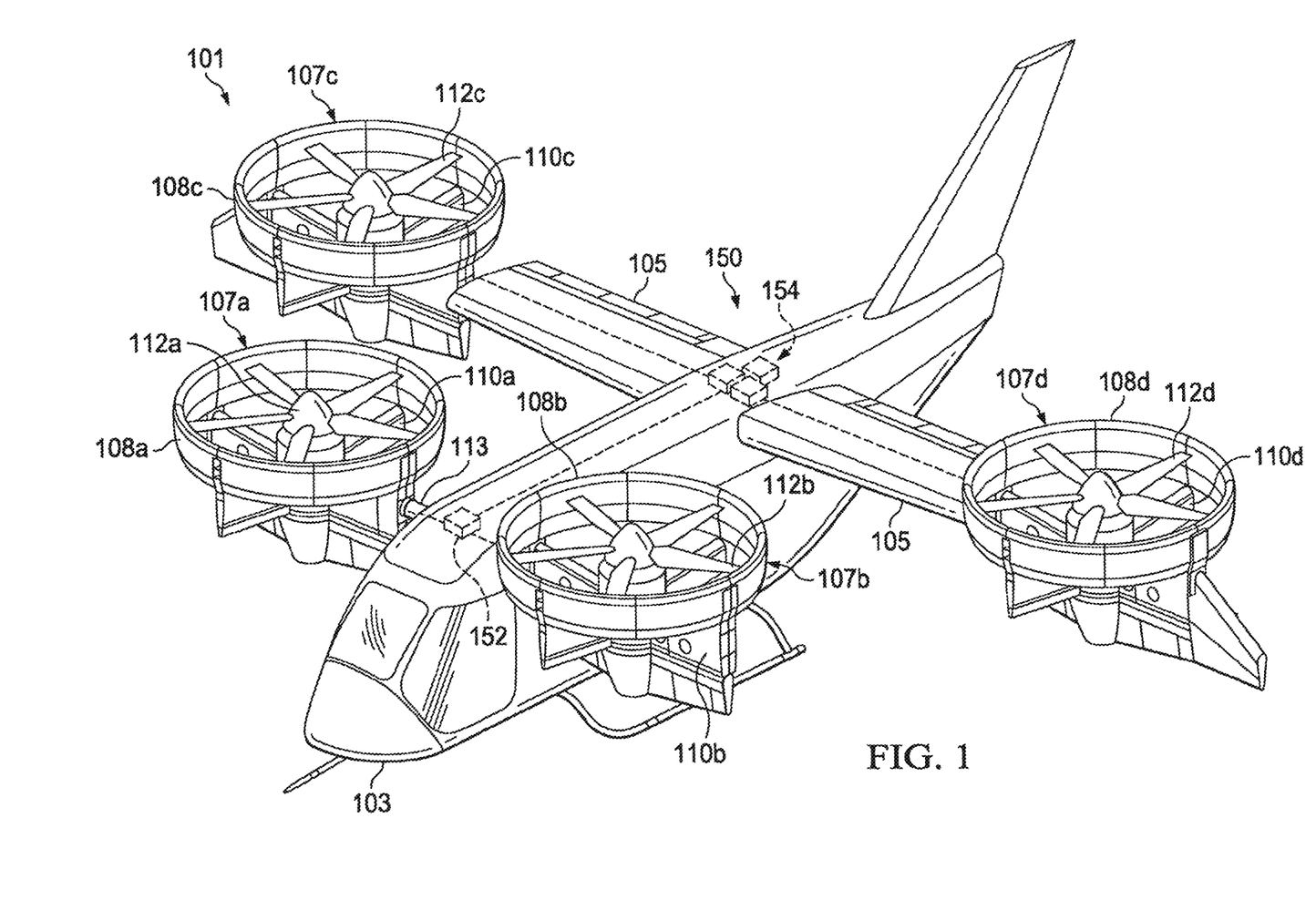
FIG. 1 is a perspective view of an aircraft oriented in a helicopter mode according to aspects of the disclosure.
Figure 2:
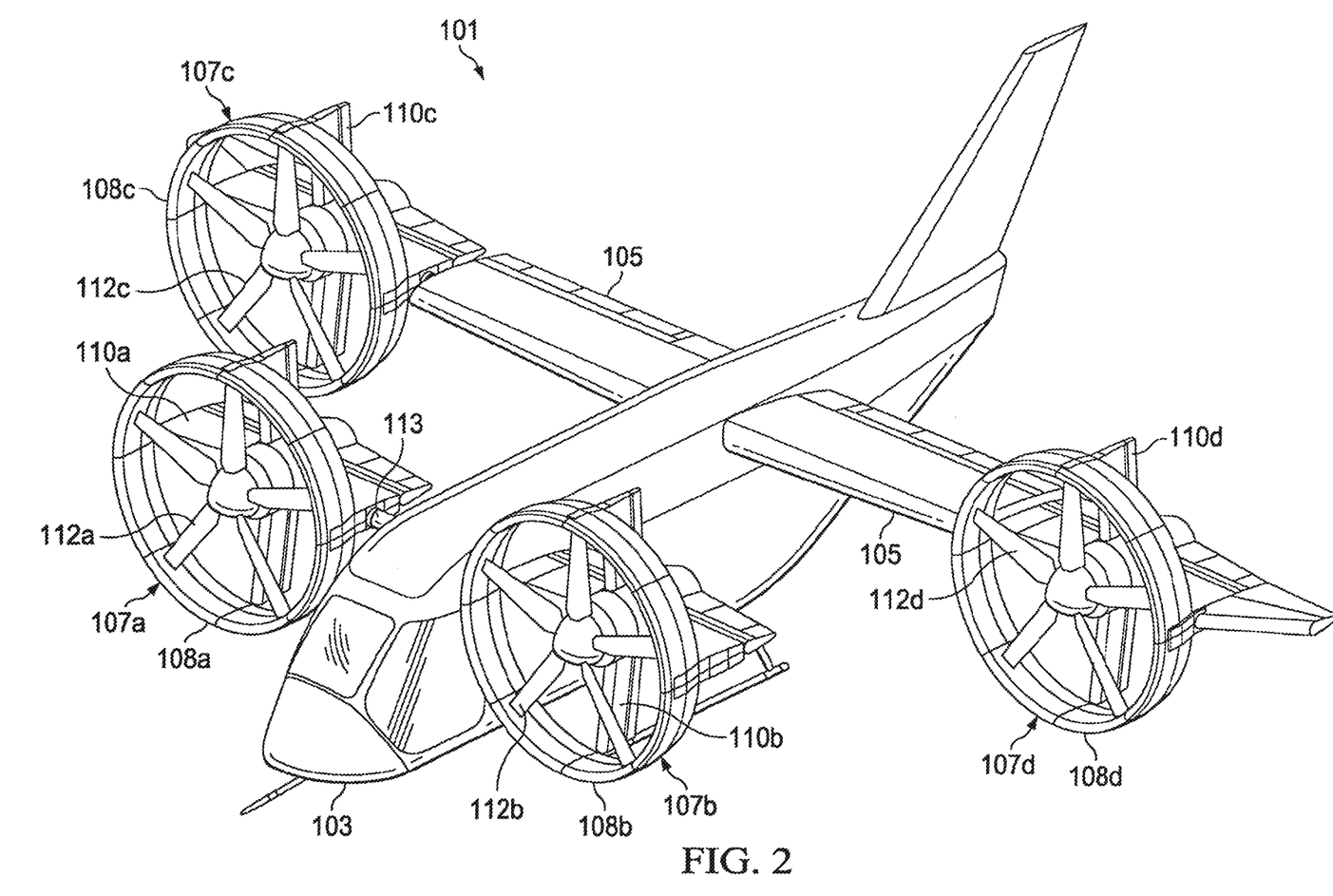
FIG. 2 is a perspective view of an aircraft oriented in an airplane mode according to aspects of the disclosure.

Referring now to FIGS. 1 and 2, perspective views of a rotorcraft 101 operating in helicopter and airplane modes, respectively, are shown according to aspects of the disclosure. Rotorcraft 101 is generally configured as a vertical takeoff and landing (VTOL) aircraft, more specifically a tiltrotor, that is operable in an airplane mode associated with forward flight and a helicopter mode associated with vertical takeoff from and landing to a landing zone. Rotorcraft 101 comprises a fuselage 103 comprising a cockpit and/or passenger compartment, wings 105 extending from the fuselage 103, a pair of ducted fan assemblies 107a, 107b carried by, supported by and/or otherwise coupled to fuselage 103, a pair of ducted fan assemblies 107c, 107d carried by, supported by, and/or otherwise coupled to wings 105. Ducted fan assemblies 107a-107d are arranged about fuselage 103 to be generally coplanar when rotorcraft 101 is in helicopter and airplane modes.

Each ducted fan assembly 107a, 107b is supported by a rotatable shaft or spindle 113 extending at least partially through fuselage 103 and coupled to the pair of ducted fan assemblies 107a, 107b. The pair of ducted fan assemblies 107a, 107b may be selectively rotated with respect to fuselage 103 by at least one actuator (e.g. electric, electromechanical, magnetic, and/or hydraulic) in order to transition rotorcraft 101 between the airplane and helicopter modes. Each ducted fan assembly 107a-107d comprises a duct 108a-108d, respectively, with each duct 108a-108d having a plurality of structural supports and/or struts 110a-110d. In some aspects, outer surfaces of the ducts 108 may be shaped to provide optimal and/or preferred flight characteristics in at least one of the airplane mode and the helicopter mode.

Ducted fan assemblies 107a, 107b each include a fan 112a, 112b, respectively. It will be appreciated that fans 112a, 112b rotate in opposing directions with respect to one another to balance the torque generated by each fan 112a, 112b. Each fan 112a, 112b includes plurality of rotor blades. Fans 112a, 112b are disposed within their respective duct 108 and are configured to generate thrust when selectively rotated. As illustrated in FIGS. 1 and 2, each fan 112a, 112b comprises five rotor blades. However, in other aspects, each fan 112a, 112b may comprise two, three, five, six, seven, eight, and/or more rotor blades.

Each wing 105 carries a single ducted fan assembly of the pair of ducted fan assemblies 107c, 107d. The pair of ducted fan assemblies 107c, 107d are supported by a rotatable shaft or spindle (e.g., similar to spindle 113) that extends at least partially through wings 105 and is coupled to the pair of ducted fan assemblies 107c, 107d. The pair of ducted fan assemblies 107c, 107d may be selectively rotated with respect to fuselage 103 by at least one actuator (e.g. electric, electro-mechanical, magnetic, and/or hydraulic) in order to transition rotorcraft 101 between the airplane and helicopter modes. The pair of ducted fan assemblies 107c, 107d are structurally similar to the pair of ducted fan assemblies 107a, 107b and each includes its own duct 108c, 108d, struts 110c, 110d, fans 112c, 112d. Compared to the pair of ducted fan assemblies 107a, 107b, the pair of ducted fan assemblies 107c, 107d are disposed further outboard of fuselage 103.

Rotorcraft 101 is controlled via flight control system 150. Flight control system 150 includes flight control computer 152 that connected to and in communication with propulsion system 154. Propulsion system 154 is controlled by flight control computer 152 and includes components that assist with the flight of rotorcraft 101. Propulsion system 154 may generally include a hybrid electrical system, a hybrid hydraulic system and/or combinations thereof. Flight control computer 152 is configured to selectively control the components of propulsion system 154 to operate rotorcraft 101. Flight control system 150 may include flight control input hardware (e.g. flight controls) configured to receive inputs and/or commands from a pilot to control operation of the rotorcraft 101 and/or a plurality of sensors and/or gauges configured to provide feedback regarding operational characteristics of rotorcraft 101 to the flight control computer 152. Additionally, flight control computer 152 may be configured to selectively control the operation, orientation, rotation, position, and/or rotational speed of the pairs of ducted fan assemblies 107a, 107b and 107c, 107d. In some aspects, flight control system 150 may comprise fly-by-wire architecture for controlling rotorcraft 101. Additionally, in some aspects, flight control system 150 may be capable of optionally-piloted operation. Furthermore, in some aspects, flight control system 150 may comprise collective pitch control for adjusting the pitch of rotor blades 124 and rotational speed control for individually adjusting a rotational speed of rotor systems 122 of each of the ducted fan assemblies 107a-107d, without the need for cyclic control for controlling operation of rotorcraft 101.

Figure 3:
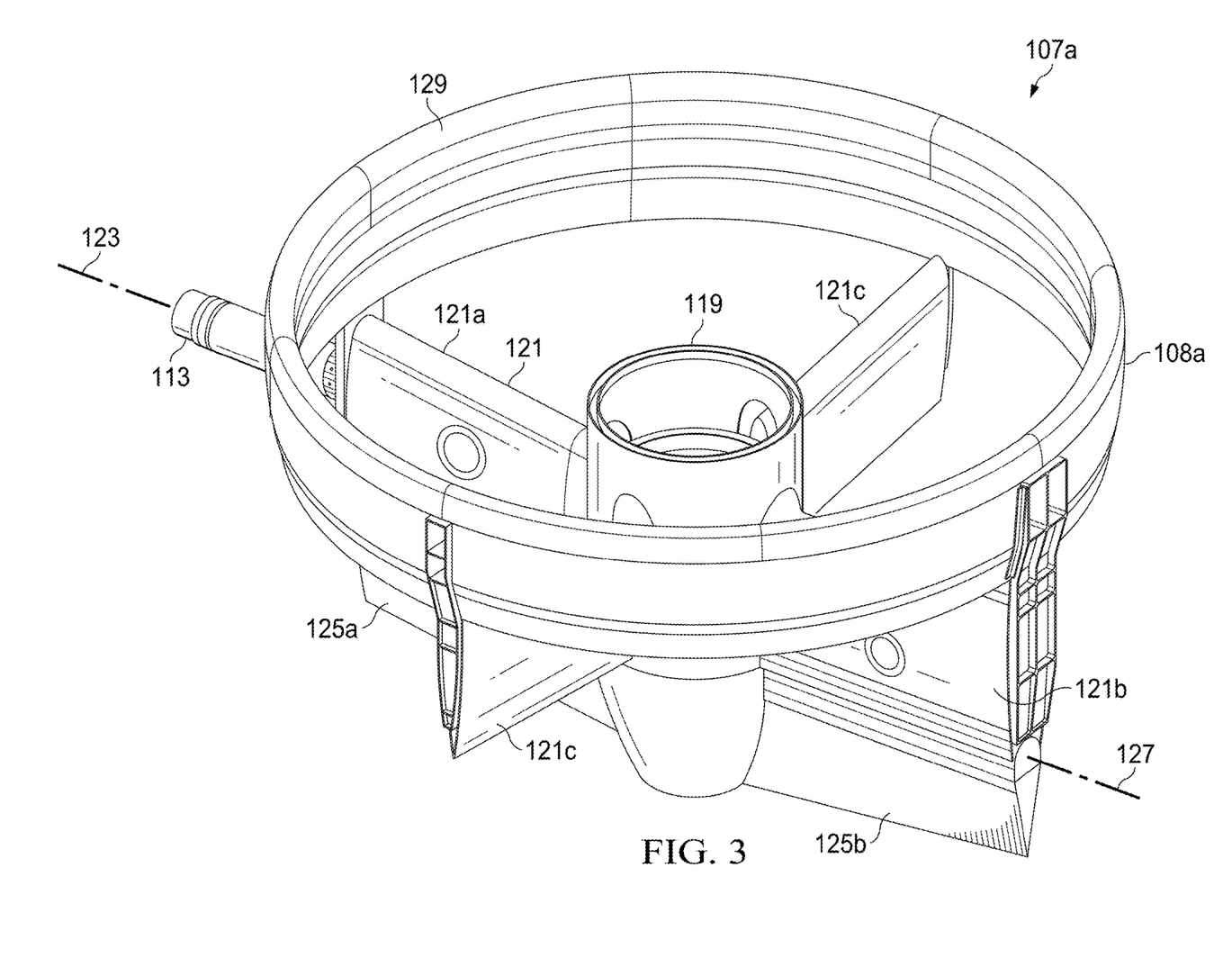
FIG. 3 is a perspective view of a ducted fan assembly according to aspects of the disclosure.

FIG. 3 illustrates ducted fan assembly 107a according to aspects of the disclosure. Ducted fan assembly 107a will be discussed with the understanding that the discussion thereof applies to ducted fan assemblies 107b-107d. Ducted fan assembly 107a is depicted in FIG. 3 without fan 112a. Ducted fan assembly 107a includes duct 108a and a central housing 119 that is configured to support and house components such as a rotor, a gearbox, and/or other components to which fan 112a may be positioned over and attached. Ducted fan assembly 107a further includes a plurality of stators 121 that extend outward from housing 119. In this embodiment, ducted fan assembly 107a includes four stators 121 that extend radially outward from housing 119. More specifically, ducted fan assembly 107a has two primary stators that include an inboard primary stator 121a and an outboard primary stator 121b. Inboard primary stator 121a is configured to be coupled to a corresponding spindle, such as spindle 113. Ducted fan assembly 107a is rotatable about a spindle axis 123 that is defined by spindle 113.

Ducted fan assembly 107a includes two secondary stators 121c. Primary inboard and outboard stators 121a, 121b respectively are configured to carry a larger proportion of the load of ducted fan assembly 107a back to fuselage 103 than are secondary stators 121c. Inboard primary stator 121a and outboard primary stator 121b are longitudinally aligned relative to each other on opposed sides of housing 119 and secondary stators 121c are longitudinally aligned relative to each other on opposed sides of housing 119 and aligned perpendicularly to inboard primary stator 121a and outboard primary stator 121b. In this regard, stators 121 are equally spaced about housing 119. It should be appreciated that ducted fan assembly 107 may be alternatively configured with more or fewer stators 121. It should further be appreciated that ducted fan assembly 107a may be alternatively configured with different spacing of stators 121 about housing 119. Ducted fan assembly 107a further includes an inboard control vane 125a and an outboard control vane 125b, which are pivotally attached to inboard primary stator 121a and outboard primary stator 121b, respectively. Inboard control vane 125a and outboard control vane 125b are pivotable about a vane axis 127 that extends parallel to spindle axis 123. In this embodiment, inboard control vane 125a and outboard control vane 125b are configured to rotate together to facilitate yaw control, changes of direction, turning, etc. during flight of rotorcraft 101. It should be appreciated, however, that inboard control vane 125a and outboard control vane 125b may alternatively be configured to rotate independently from one another. It should further be appreciated that ducted fan assembly 107a is not limited to the illustrated configuration of inboard control vane 125a and outboard control vane 125b. For example, ducted fan assembly 107a may alternatively be configured with more or fewer control vanes, such as a single control vane that defines a continuous control surface. Ducted fan assembly 107a may include a leading edge 129 that forms an aerodynamic outer covering of ducted fan assembly 107a, and that defines an opening that extends through ducted fan assembly 107a. As shown, housing 119 is located primarily aft of the opening. An outer surface of leading edge 129 can include, for example, one or more sections of skin.

Figure 4:
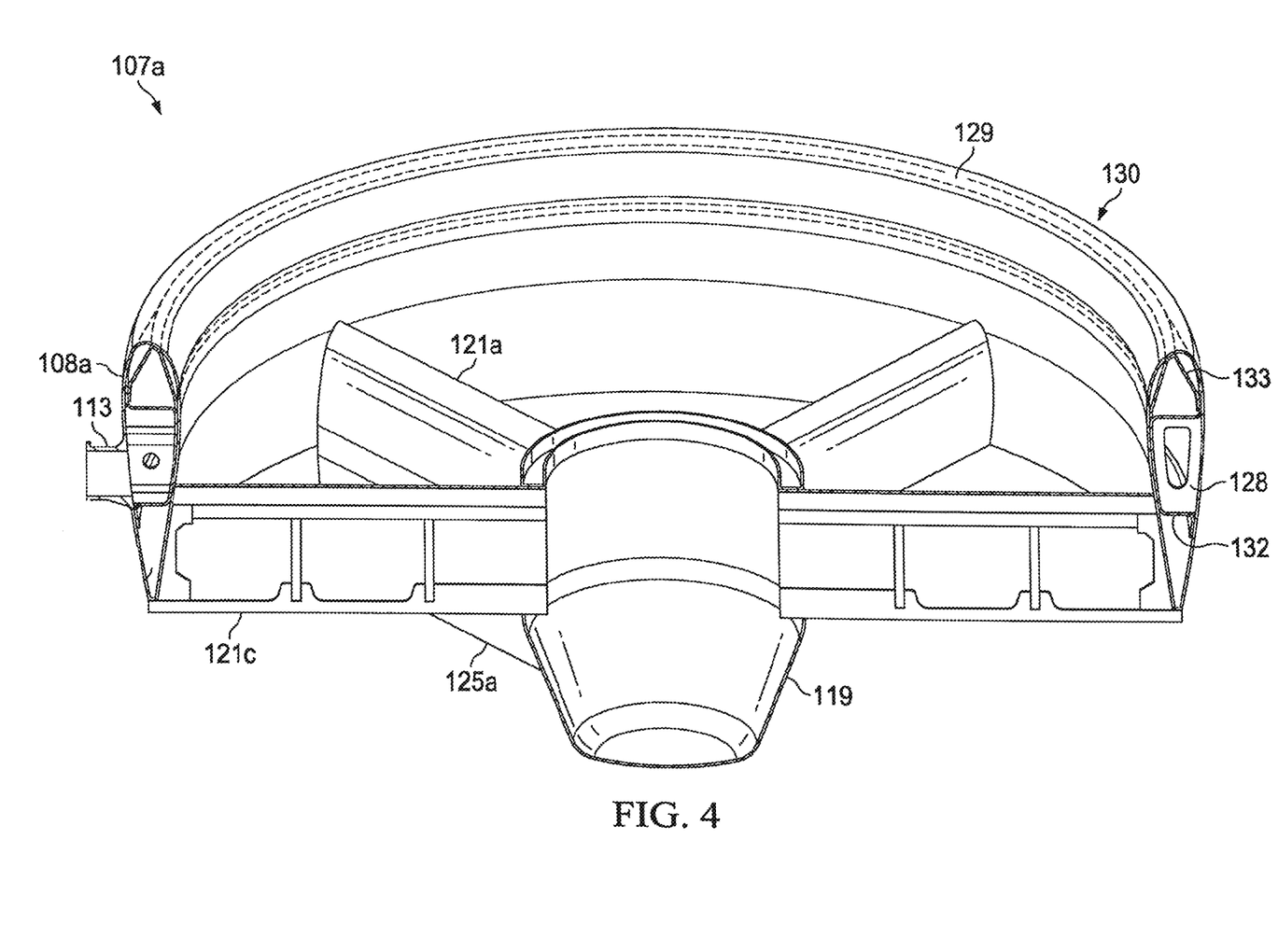
FIG. 4 is a sectioned view of a ducted fan assembly according to aspects of the disclosure.

FIG. 4 is a sectioned view of ducted fan assembly 107a according to aspects of the disclosure. Ducted fan assembly 107a includes a rim 128 that extends around the perimeter of duct 108a and is supported by the plurality of stators 121 and the control vanes 125. Rim 128 provides structure and support for ducted fan assembly 107a. As shown in FIG. 4, rim 128 defines an opening surrounding at least a portion of central housing 119.

A skin 130 is attached to rim 128 to form leading edge 129, with blade 133 disposed beneath skin 130. In some aspects, rim 128 includes a frame 132 that in cross-section forms a hat-like shape. Frame 132 reinforces rim 128 and provides additional structure to which skin 130 may be secured. Rim 128 is positioned within duct 108a to be adjacent to fan 112a. In certain embodiments, rim 128 is made from metals or composites that are more rigid than skin 130, such that the rim 128 has greater rigidity than skin 130. In some embodiments, in order to maintain proper spacing between fan 112a and duct 108a, it is advantageous for at least the portion of duct 108a that is adjacent to the tips of fan 112a (e.g., its blade tips) be rigid.

Skin 130 is designed to be frangible and may be formed from a pliable or brittle material (e.g. carbon fiber, ductile aluminum, fiberglass, nylon or sheet metal) that can deform or break away in the event a foreign object (e.g., a bird) impacts skin 130 during flight. Allowing skin 130 to deform or break away allows the energy to transfer into blade 133, which reduces the amount of energy transferred to the structure, for example, by splitting a bird mass. Skin 130 is rigid enough to provide a desired aerodynamic shape to improve the performance of duct 108a (i.e., maintains shape for the efficient flow of air over duct 108a to improve the amount of thrust generated by ducted fan assembly 107a), but can deform or break out of the way in the event of impact with a foreign object (e.g., a bird-strike event), thereby allowing a leading edge of blade 133 to make substantial contact with the foreign object. For example, skin 130 may be made from various polymers. In some aspects, the polymer is an epoxy material and may be reinforced with fibers (e.g., polymers and the like). As will be described in greater detail relative to FIG. 5, skin 130, frame 132 and/or blade 133 may collectively define or create various cavities therebetween.

Figure 5:
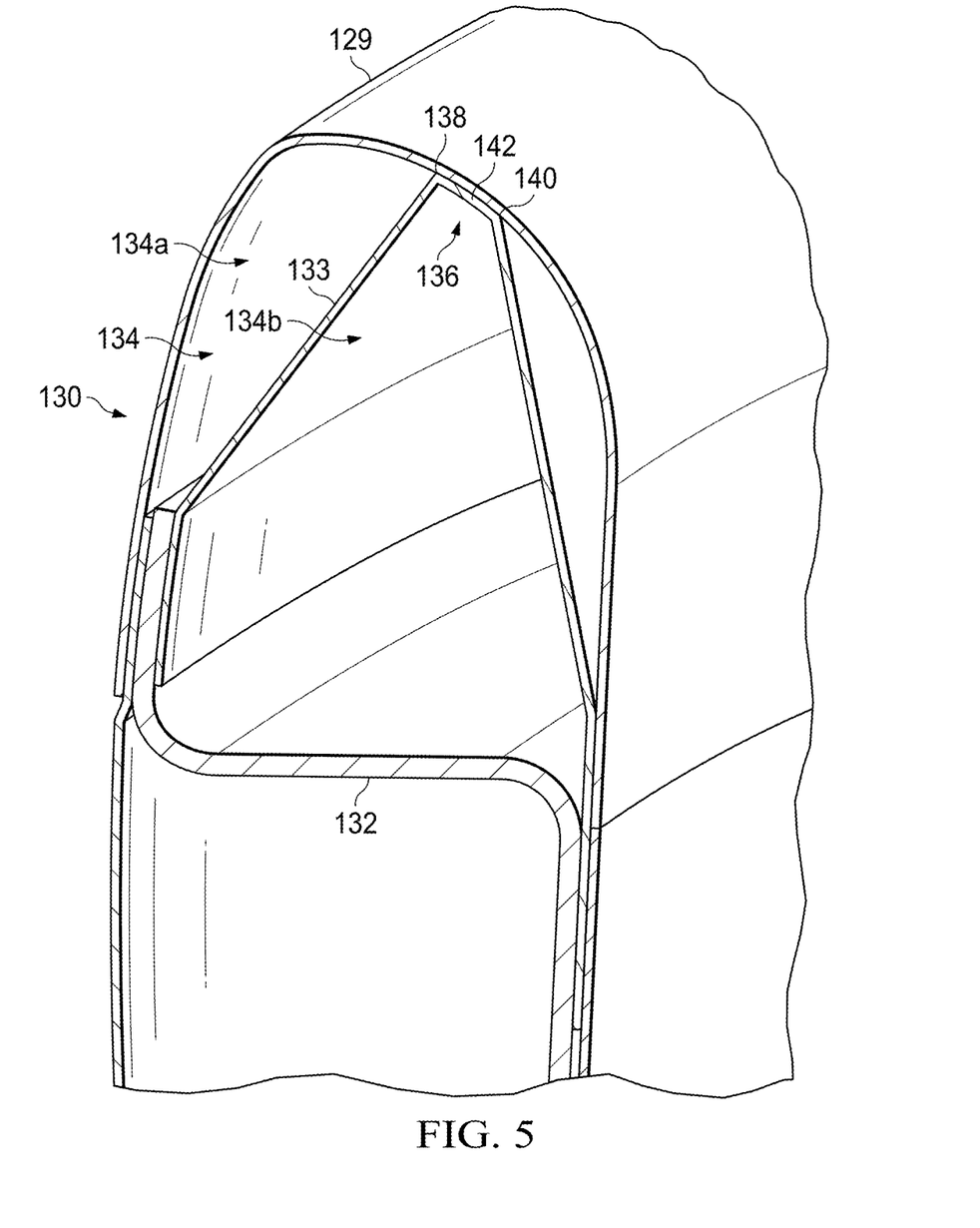
FIG. 5 is a sectioned view of a leading edge of a duct according to aspects of the disclosure.

FIG. 5 is a sectioned view of leading edge 129 of ducted fan assembly 107a. A shape of leading edge 129 is formed by skin 130 and is designed to provide desired air flow characteristics to improve the performance of ducted fan assembly 107a. A cavity 134 between skin 130 and frame 132 is created thereby. As described previously, skin 130 is designed to be frangible or deformable. For example, skin 130 is designed to give way, into cavity 134, when leading edge 129 is impacted by a foreign object (e.g., a bird). Blade 133 sits beneath skin 130 within cavity 134, and splits cavity 134 into an upper cavity 134a and a lower cavity 134b. In some embodiments, lower cavity 134b can instead be solid. In these embodiments, blade 133 or other material can fill all or a portion of the space denoted as lower cavity 134b. Blade 133 may be attached to frame 132 of duct 108a, or may be integrally formed as a portion of duct 108a. In contrast to skin 130, blade 133 is a rigid structure. In some aspects, blade 133 acts as a support for skin 130, contacting an underside of skin 130 at one or more points to act as a brace. In other aspects, skin 130 is rigid enough to maintain its shape during normal flight conditions, but soft enough to deform and/or break when impacted by a foreign object.

Blade 133 includes a peak 136 that comes to a point (e.g., tapers). As illustrated in FIG. 5, peak 136 includes two edges 138, 140 that define a span 142 therebetween, where edge 138 serves as the point, or cutting edge, of blade 133. In some aspects, span 142 makes contact with skin 130 to provide some structural support for skin 130. In other aspects, span 142 does not contact skin 130. Blade 133, via peak 136 and, more particularly, edge 138, is meant to split or deflect the mass of foreign objects that impact leading edge 129. For example, as a foreign object impacts leading edge 129, skin 130 will give way (e.g., deform or rupture) to blade 133 beneath. Foreign objects that impact blade 133 are divided into two pieces by edge 138. Splitting the mass of the foreign object helps minimize the damage imparted to duct 108a. In some aspects, peak 136 is offset radially inward toward the central axis of duct 108a. Offsetting peak 136 toward the central axis of duct 108a increases the likelihood that more of the mass of the foreign object will be directed outside of duct 108a. It is preferable to direct as much mass of the foreign object as possible to the outside of duct 108a to minimize the potential for damaging fan 112a.

In various embodiments, the frangible nature of skin 130, by design, results in immediate visible evidence of impacts with foreign objects. In many cases, this visible evidence facilitates a prompt inspection of ducted rotor assembly 107a for further damage.

Depending on the aspect, certain acts, events, or functions of any of the methods described herein can be performed in a different sequence, can be added, merged, or left out altogether (e.g., not all described acts or events are necessary for the practice of the methods. Moreover, in certain aspects, acts or events can be performed concurrently. Other aspects are possible in which these tasks are performed by a different entity.

Conditional language used herein, such as, among others, "can," "might," "may," "e.g.," and the like, unless specifically stated otherwise, or otherwise understood within the context as used, is generally intended to convey that certain aspects include, while other aspects do not include, certain features, elements and/or states. Thus, such conditional language is not generally intended to imply that features, elements and/or states are in any way required for one or more aspects or that one or more aspects necessarily include logic for deciding, with or without author input or prompting, whether these features, elements and/or states are included or are to be performed in any particular aspect.

The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed aspect, the terms "substantially," "approximately," "generally," "generally in the range of," and "about" may be substituted with "within [a percentage] of" what is specified, as understood by a person of ordinary skill in the art. For example, within 1%, 2%, 3%, 5%, and 10% of what is specified herein.

While the above detailed description has shown, described, and pointed out novel features as applied to various aspects, it will be understood that various omissions, substitutions, and changes in the form and details of the devices or algorithms illustrated can be made without departing from the spirit of the disclosure. As will be recognized, the processes described herein can be embodied within a form that does not provide all of the features and benefits set forth herein, as some features can be used or practiced separately from others. The scope of protection is defined by the appended claims rather than by the foregoing description. All changes which come within the meaning and range of equivalency of the claims are to be embraced within their scope.

What is claimed is:

1. A ducted fan assembly comprising:
    a housing comprising a rotor;
    a rim that extends around at least a portion of a perimeter of the ducted fan assembly;
    wherein the rim defines an opening surrounding at least a portion of the housing;
    a rigid frangible skin attached to the rim and extending around the at least a portion of a perimeter of the ducted fan assembly to form a leading edge of the ducted fan assembly
    a blade positioned on the rim underneath the rigid frangible skin; and
    wherein the blade is in contact with less than all of a cross-sectional area of the rigid frangible skin.

2. The ducted fan assembly of claim 1, wherein the blade structurally supports the rigid frangible skin.

3. The ducted fan assembly of claim 1, wherein the blade has greater rigidity than the rigid frangible skin.

4. The ducted fan assembly of claim 3, wherein the rigid frangible skin is configured to at least one of deform and break upon impact with a foreign object.

5. The ducted fan assembly of claim 4, wherein the blade is configured to split the foreign object into two or more pieces.

6. The ducted fan assembly of claim 1, wherein the blade comprises a peak that comes to a point.

7. The ducted fan assembly of claim 6, wherein the peak comprises a first edge and a second edge that define a span therebetween.

8. The ducted fan assembly of claim 7, wherein the span makes contact with the rigid frangible skin and provides structural support for the rigid frangible skin.

9. The ducted fan assembly of claim 6, wherein the peak is offset radially inward toward a central axis of the ducted fan assembly.

10. The ducted fan assembly of claim 1, comprising a fan positioned over the housing and attached to the rotor, wherein the fan is adjacent to the rim such that the opening defined by the rim surrounds the fan.

11. A rotorcraft comprising a plurality of fan assemblies, each fan assembly comprising:
 a housing comprising a rotor;
 a rim that extends around at least a portion of a perimeter of the fan assembly; wherein the rim defines an opening surrounding at least a portion of the housing;
 a rigid frangible skin attached to the rim and extending around the at least a portion of a perimeter of the fan assembly to form a leading edge of the fan assembly;
 a blade positioned on the rim underneath the rigid frangible skin;
 wherein the blade is in contact with less than all of a cross-sectional area of the rigid frangible skin.

12. The rotorcraft of claim 11, wherein one or more of the plurality of fan assemblies are ducted fan assemblies.

13. The rotorcraft of claim 11, wherein the rotorcraft is a tiltrotor aircraft and the plurality of fan assemblies rotate between an airplane mode and a helicopter mode.

14. The rotorcraft of claim 11, wherein, for each fan assembly of the plurality of fan assemblies, the blade structurally supports the rigid frangible skin and has greater rigidity than the rigid frangible skin.

15. The rotorcraft of claim 11, wherein, for each fan assembly of the plurality of fan assemblies, the rigid frangible skin is configured to at least one of deform and break upon impact with a foreign object.

16. The rotorcraft of claim 15, wherein, for each fan assembly of the plurality of fan assemblies, the blade is configured to split the foreign object into two or more pieces.

17. The rotorcraft of claim 11, wherein, for each fan assembly of the plurality of fan assemblies, the blade comprises a peak that comes to a point.

18. The rotorcraft of claim 17, wherein, for each fan assembly of the plurality of fan assemblies, the peak comprises a first edge and a second edge that define a span therebetween.

19. The rotorcraft of claim 18, wherein, for each fan assembly of the plurality of fan assemblies, the span makes contact with the rigid frangible skin and provides structural support for the rigid frangible skin.

20. The rotorcraft of claim 18, wherein, for each fan assembly of the plurality of fan assemblies, the peak is offset radially inward toward a central axis of the fan assembly.

* * * * *

UNITED STATES PATENT AND TRADEMARK OFFICE
CERTIFICATE OF CORRECTION

PATENT NO. : 11,479,338 B2
APPLICATION NO. : 17/037082
DATED : October 25, 2022
INVENTOR(S) : Timothy Brian Carr et al.

It is certified that error appears in the above-identified patent and that said Letters Patent is hereby corrected as shown below:

In the Claims

| | |
|---|---|
| Column 6, Claim 1, Lines 60-61 | Replace "fan assembly" with -- fan assembly; and -- |
| Column 6, Claim 1, Lines 62-63 | Replace "frangible skin; and" with -- frangible skin; -- |
| Column 7, Claim 11, Line 32 | Replace "fan assembly;" with -- fan assembly; and -- |

Signed and Sealed this
Tenth Day of January, 2023

Katherine Kelly Vidal
*Director of the United States Patent and Trademark Office*